US011475889B2

(12) United States Patent
Grgac et al.

(10) Patent No.: US 11,475,889 B2
(45) Date of Patent: Oct. 18, 2022

(54) VOICE ACTIVATED LIFTGATE (71) Applicant: Magna Exteriors Inc., Concord (CA)

(72) Inventors: Steven S. Grgac, Concord (CA); Yassir Rizwan, Kitchener (CA); Thomas Reidemeister, Waterloo (CA); Guy Martin Tchamgoue, Kitchener (CA)

(73) Assignee: Magna Exteriors Inc., Concord (CA)

( * ) Notice: Subject to any disclaimer, the term of this patent is extended or adjusted under 35 U.S.C. 154(b) by 445 days.

(21) Appl. No.: 16/613,658

(22) PCT Filed: May 24, 2018

(86) PCT No.: PCT/IB2018/053703
§ 371 (c)(1),
(2) Date: Nov. 14, 2019

(87) PCT Pub. No.: WO2018/215972
PCT Pub. Date: Nov. 29, 2018

(65) Prior Publication Data
US 2021/0174793 A1 Jun. 10, 2021

Related U.S. Application Data (60) Provisional application No. 62/511,102, filed on May 25, 2017.

(51) Int. Cl.
G10L 15/22 (2006.01)
E05F 15/76 (2015.01)
(Continued)

(52) U.S. Cl.
CPC .............. G10L 15/22 (2013.01); E05B 81/78 (2013.01); E05F 15/76 (2015.01);
(Continued)

(58) Field of Classification Search
CPC ...... G10L 15/22; G10L 21/0232; G10L 25/84; G10L 2015/223; G10L 2021/02166;
(Continued)

(56) References Cited

U.S. PATENT DOCUMENTS 5,187,361 A 2/1993 Ishii
6,496,107 B1 12/2002 Himmelstein
(Continued)

FOREIGN PATENT DOCUMENTS

CN 103572093 A 2/2014
CN 104036787 A 9/2014
(Continued)

OTHER PUBLICATIONS

European Search Report for Application No. 18806576.7, dated May 20, 2020.
(Continued)

Primary Examiner — Yogeshkumar Patel
(74) Attorney, Agent, or Firm — Warn Partners, P.C.

(57) ABSTRACT

An independent add-on automated vehicle lift gate system utilizing existing key fob authentication circuits in combination with an independent voice control system. The system uses microphones in connection with audio acquisition hardware and voice recognition hardware that actively listen for one or more voiced commands from a user outside of a vehicle. Before activating the mechanical system, which is for example the actuator of the lift gate and lock mechanism for the lift gate, the system will wait for confirmation from a separate vehicle system that monitors and notifies the vehicle lift gate system when an identification code is received from a key fob transponder located in a predetermined proximity of the vehicle, thereby authenticating the one or more voiced commands detected by the microphones.

14 Claims, 5 Drawing Sheets (51) Int. Cl.
  *E05B 81/78* (2014.01)
  *G10L 21/0232* (2013.01)
  *G10L 25/84* (2013.01)
  *H04R 1/08* (2006.01)
  *H04R 1/40* (2006.01)
  *H04R 3/00* (2006.01)
  *E05F 15/73* (2015.01)
  *G10L 21/0216* (2013.01)

(52) U.S. Cl.
  CPC .......... *G10L 21/0232* (2013.01); *G10L 25/84* (2013.01); *H04R 1/08* (2013.01); *H04R 1/406* (2013.01); *H04R 3/005* (2013.01); *E05F 2015/763* (2015.01); *E05Y 2400/44* (2013.01); *E05Y 2400/45* (2013.01); *E05Y 2400/856* (2013.01); *E05Y 2900/531* (2013.01); *E05Y 2900/546* (2013.01); *G10L 2015/223* (2013.01); *G10L 2021/02166* (2013.01); *H04R 2201/401* (2013.01); *H04R 2499/13* (2013.01)

(58) Field of Classification Search
  CPC .......... H04R 1/08; H04R 1/406; H04R 3/005; H04R 2201/401; H04R 2499/13; E05B 81/78; E05F 15/76; E05F 15/77; E05F 15/73; E05F 2015/763; E05Y 2400/44; E05Y 2400/45; E05Y 2400/856; E05Y 2900/531; E05Y 2900/546; E05Y 2400/85; G07C 9/00309; G07C 2009/00769; G07C 2209/64; B60R 25/24; B60R 25/246; B60R 25/257
  See application file for complete search history.

(56) References Cited

U.S. PATENT DOCUMENTS

| | | |
|---|---|---|
| 6,975,408 B2 | 12/2005 | Igaki |
| 9,243,439 B2 | 1/2016 | Adams et al. |
| 2003/0122652 A1 | 7/2003 | Himmelstein |
| 2008/0154613 A1 | 6/2008 | Haulick et al. |
| 2009/0125311 A1* | 5/2009 | Haulick .............. B60R 16/0373 704/275 |
| 2009/0309713 A1 | 12/2009 | Baruco et al. |
| 2010/0041337 A1 | 2/2010 | Lofton |
| 2012/0229253 A1 | 9/2012 | Kolar |
| 2014/0277837 A1 | 9/2014 | Hatton |
| 2015/0247352 A1* | 9/2015 | Adams .................... E05F 15/76 701/2 |
| 2017/0030133 A1 | 2/2017 | Elie et al. |

FOREIGN PATENT DOCUMENTS

| | | |
|---|---|---|
| CN | 106287786 A | 1/2017 |
| DE | 10038803 A1 | 2/2002 |
| EP | 1884421 A1 | 2/2008 |

OTHER PUBLICATIONS

International Search Report and Written Opinion for Application No. PCT/IB2018/053703, dated Jul. 16, 2018.
Chinese Search Report for application 201880034210.9, dated Jan. 11, 2021.
Canadian Search Report for Application No. 3052240, dated Dec. 5, 2019.

* cited by examiner

VOICE ACTIVATED LIFTGATE

CROSS-REFERENCE TO RELATED APPLICATIONS

This application is a National Stage of PCT International Application No. PCT/IB2018/053703 filed May 24, 2018, which claims the benefit of U.S. Provisional Patent Application No. 62/511,102 filed on May 25, 2017. The disclosures of the above applications are incorporated herein by reference.

FIELD OF THE INVENTION

The present invention relates to voice activated lift gate system for a vehicle utilizing existing key fob authentication circuits in combination with an independent voice recognition module.

BACKGROUND OF THE INVENTION

Numerous hands-free access systems for ensuring automatic unlocking/release and opening of the opening members of the vehicle as soon as the user, carrying an identification key fob, approaches the vehicle and enters a designated perimeter area or distance from the vehicle. Many conventional systems employ the use of an approach sensor coupled to the hands-free access system so that an authentication attempt is triggered when the approach sensor detects the presence of a user. Thus, in the case where the authentication attempt is successful, the recognition device triggers the unlocking of one or more opening members of the vehicle. Many systems in existence today rely upon the user making some type of physical activation gesture. For example some cars have sensors underneath the vehicle rear bumper that detect when a user waves their foot in view of the sensor, thereby triggering the activation of the mechanical system of the lift gate. This creates a potential problem for persons carrying large heavy objects or persons with physical disabilities who may have difficulty balancing on one foot while waving a free foot in front of the sensor.

Voice command devices are finding more use in society today such as: for calling and controlling phones; searching on the internet from web connected devices; and, the like. Vehicles have harnessed this technology for entering and controlling data in navigation systems and "smart" radio systems often found in passenger vehicles today.

These voice command devices are typically found in the controlled interior of a vehicle where the microphones and electronics necessary to effectively operate the voice controlled device are in a known sound and weather protected environment. Because the area outside a vehicle is unpredictable in both weather and sound, voice control coming from outside of the vehicle has not been readily practical, even though controlling activities such as: opening vehicle doors; starting the vehicle, turning operation and safety lights on and off; emergency alerts or other commands which might be desirable for controlling from the outside of the vehicle are desirable. This adds to the complexity of using voice commands from the outside of the vehicle.

Therefore, there remains a need in the art to solve these problems and provide a mechanism for voice control which is reliable for voice control of vehicle functions from outside of the vehicle.

SUMMARY OF THE INVENTION

The present invention is directed to an independent add-on automated vehicle lift gate system utilizing existing key fob authentication circuits in combination with an independent voice actuation unit. The system uses audio acquisition hardware including microphones in connection with voice recognition hardware and software that actively listen for one or more voiced commands from a user outside of a vehicle. Before activating the mechanical system, such as for example an actuator of the lift gate and lock mechanism for the lift gate, the system will wait for confirmation from a separate vehicle system that monitors and notifies the vehicle lift gate system when an identification code is received from a key fob transponder located in a predetermined proximity of the vehicle, thereby authenticating the one or more voiced commands detected by the microphones.

In one embodiment of the present invention there is a vehicle voice control system having a voice actuation unit that listens for a voiced command and on receipt of the voice command the voice activation unit generates a signal to activate a mechanical system. The voice actuation unit consists of several different components and includes one or more microphones, audio acquisition hardware, such as an amplifier for filtering out background noise and voice recognition hardware and software, for example a computer device with software that interprets commands that are detected by the one or more microphones. The mechanical system includes, but is not limited to actuators for vehicle locks, windows, sunroof, trunk, hood, fuel door, spare tire and lift gate actuators.

The system further includes a key fob transponder that outputs an identification code. Typically the identification code is transmitted to a separate vehicle system, such as an existing key fob authentication circuit, that is independent from the voice control system. Also included with the vehicle voice control system is a receiver-processor that verifies the identification code and confirms that it is an authorizing code and when the identification code is an authorizing code, the receiver processor authorizes the mechanical system to be activated by the signal generated from the voice actuation unit to the mechanical system.

In a second embodiment of the invention the vehicle voice control system includes a voice actuation unit that listens for a voice command and on receipt of the voice command the voice actuation unit generates an activation signal. There is also a key fob transponder that receives the activation signal and outputs an identification code and an open or close command. A receiver-processor receives identification code and verifies that identification code is an authorizing code and when the identification code is an authorizing code the receiver-processor authorizes a mechanical system to be activated by said open or close command.

In a third embodiment of the present invention the vehicle voice control system includes a voice actuation unit that listens for a voice command and on receipt of the voice command that voice actuation unit generates an open or close command signal to a mechanical system. There is also a key fob transponder that outputs an identification code. A receiver-processor receives identification code and verifies that the identification code is an authorizing code and when the identification code is an authorizing code, the receiver-processor authorizes a mechanical system to execute the open or close command signal.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
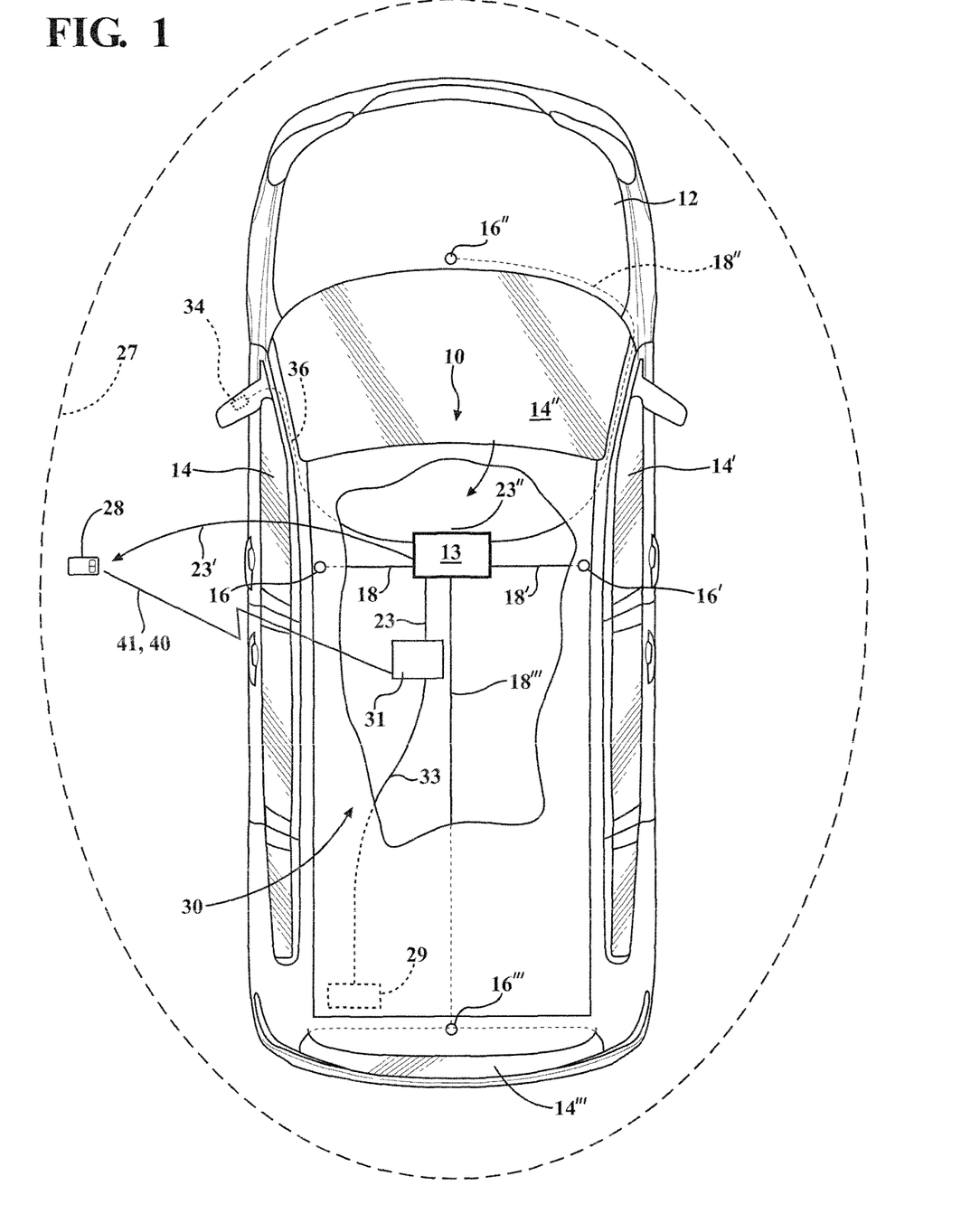
FIG. 1 depicts an overhead schematic view of a vehicle with the microphone listening devices positioned on or within the exterior of the vehicle.
Figure 2:
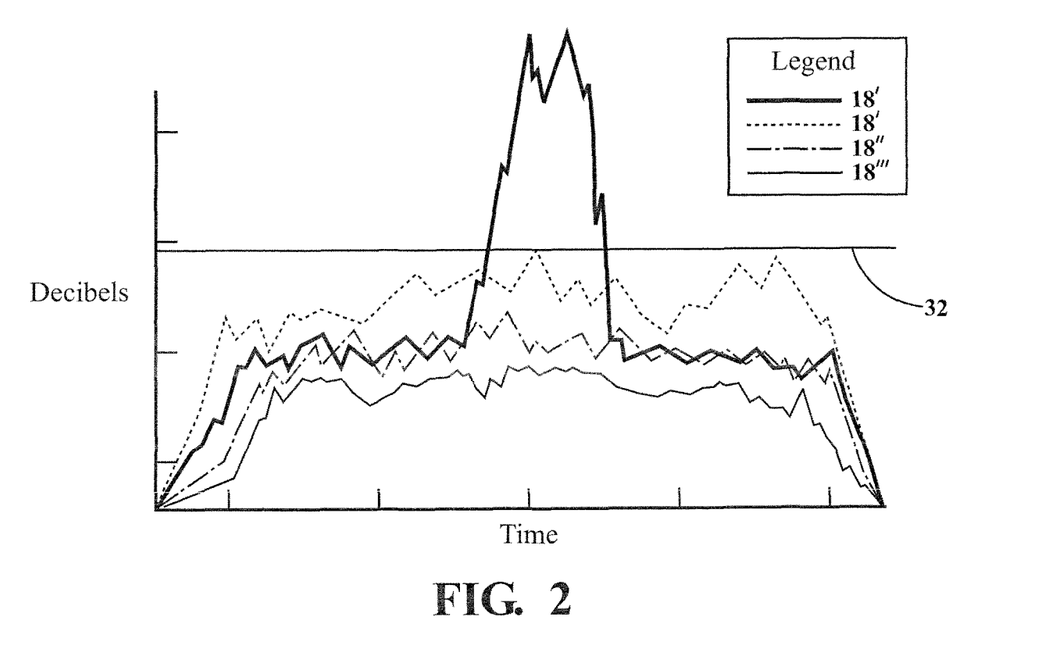
FIG. 2 shows an illustrative graph of the different signals received from by the controller.
Figure 3:
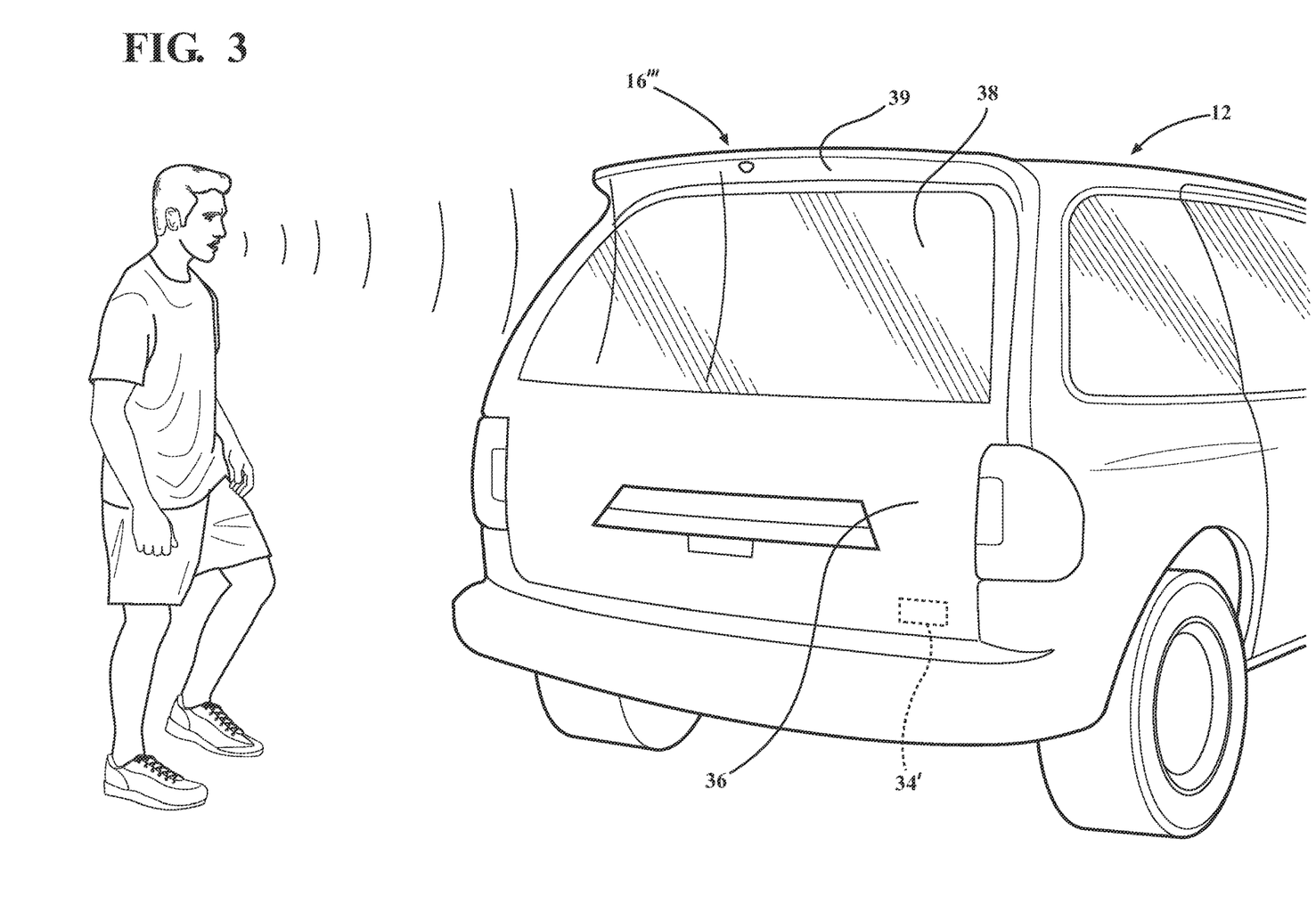
FIG. 3 is a side view of the rear of a vehicle with the microphone listening device located on the exterior of the vehicle.

Referring now to FIGS. 1-3 there is provided a voice control system 10 for a vehicle 12. The vehicle 12 has a driver side window 14, passenger side 14', front side 14" and rear side 14"'. There is a voice actuation unit 13 that includes a computer device within the vehicle 12 that includes microphones 16, 16', 16", 16"' mounted to the exterior of the vehicle 12 at exterior locations near the driver side 14, passenger side 14', front side 14" and rear side 14"' of the vehicle 12. While four microphones 16, 16', 16", 16"' are shown and described, it is within the scope of this invention for a greater or lesser number of microphones to be used depending on the particular requirements of a specific application. The exterior locations of the microphones 16, 16', 16", 16" on the exterior surface of the vehicle can vary, however, it is within the scope of this invention for the locations to include one of a spoiler, a center high mounted stop lamp housing, a back-up camera housing, door panel, lift gate panel, roof, roof rail, roof pillar and a side view mirror housing. FIG. 1 shows an alternate location of a microphone 34 mounted in a driver side mirror housing, which detects voice commands near the driver side 14 of the vehicle 12.

FIG. 1 the microphones 16, 16', 16", 16"', 34 listen for a voice command and each generate a listening signal 18, 18', 18", 18"', 36 to a computer device 24 contained within the vehicle 12. The listening signal contains data relating to the soundwaves detected by the microphones, the soundwaves include human voices as well as other ambient or background soundwaves from any source, such as traffic, wind, weather, or any other detectable noises. As explained in greater detail below, the capturing soundwaves from each microphone 16, 16', 16", 16"', 34 allows the software of the computer device 24 to perform a comparison of each listening signal 18, 18', 18", 18"', 36 in order to filter out ambient noise and more accurately determine when a voice command is given by the user.

The voice actuation unit 13 in one embodiment of the invention is the central computer unit for the vehicle or in the alternative it can be a separate computer device capable of sending signals to the vehicle's central computer or to a mechanical system 30. The voice actuation unit 13 uses the listening signals 18, 18', 18", 18"', 36 to determine the presence of a pre-identified command of the user and then generates an activation signal 23 to a mechanical system 30 in the vehicle 12 in response to the pre-identified command. The mechanical system 30 shown generally in FIG. 1, includes some type of actuator 29, for example a DC motor or solenoid connected to a mechanism, for a portion of the vehicle 12. The mechanical system 30 also includes systems where the actuator 29 is connected to a receiver processor 31 that can authorize the activation signal by verifying an authorizing code 40 received from a key fob The receiver processor 31 can also be a controller or to the central vehicle computer which receives the activation signal 23 and then commands the actuator to operate. The receiver processor 31, if implemented, will transmit an actuator activation signal 33 to the actuator 29. The type of actuator can include but is not limited to door unlocking, door opening, window opening, vehicle ignition, vehicle lights, opening rear lift gate or trunk, fuel door actuator and emergency alert functions such as sounding the horn and flashing the vehicle lights.

The type of voice command can be preset or learned by the voice actuation unit 13 using setup software programmed into the computer device 24 and will include spoken words like "start", "open lift gate", "unlock", "lock", "lights on", "lights off", "help", "open windows", "close windows" or any other verbal commands in any type of spoken language. The software is also capable of learning new commands that can be programmed by the user. In order to provide extra security, the voice control system 10 is programmed to only operate when a key fob or other identification device 28, such as a smartphone, is detected within a predetermined distance from the vehicle 12. Depicted in FIG. 1 as a perimeter circle 27 around vehicle 12. This will ensure that the voice command being detected is that of the vehicle owner.

In FIG. 1 the voice actuation unit 13 is depicted to receive the listening signal 18, 18', 18", 18"', 36 from multiple microphones 16, 16', 16", 16"', 34, 37. The voice actuation unit 13 has voice activation software programmed thereon that it either preprogrammed with or learns the different commands. The voice activation software can also perform analysis of each the listening signal 18, 18', 18", 18"' in order to filter out ambient noise that can be interpreted as false command signals. FIG. 2 depicts a graph of each the listening signal 18, 18', 18", 18"' received by the computer 24 plotted as decibels over time. As shown the listening signal 18" has several large peaks that are higher than the lines for listening signal 18', 18", 18"'. A line 32 has been drawn horizontally across the graph to illustrate that the decibel readings below line 32 are ambient noise readings that the voice activation software program will filter out and ignore as ambient noise, while focusing on the peak values of the listening signal 18 to determine if a real command has been given. FIG. 2 contains just one example of the filtering operations performed by the voice actuation unit 13 using the voice activation software programmed thereon. It is possible that the controller can perform other filtering operations where there are more complex overlapping signal values. It is also within the scope of this invention for the controller to communicate with and utilize pre-existing onboard speech recognition software that resides on other hardware in the vehicle, such as in the vehicle electronic control unit, entertainment unit or other control unit.

In further regard to the alternate placement of the microphone, it is described above that that the microphone 34 is mountable to other locations on the external surface of the vehicle 12 or at locations on the interior of the vehicle 12. For example the microphone 34 can be mounted to bumpers, spoilers, or in the actual body panels of the vehicle 12. Including microphones at various locations allows the voice control system 10 to operate with microphones 16, 16', 16", 16''' at other locations are not working properly due to damage or if they are moved. For example in FIG. 3 a microphone 34' is mounted on the inside surface of a moveable lift gate 36, since when the lift gate 36 is swung open the microphone 16''' might not work because the lift gate 36 has been moved so that the microphone 16''' is facing upward and thereby might not be able to detect a voice command from the user. In such a case the microphone 34' will be able to listen for a voice command from a user, for example a command to close the lift gate 36 can now be detected.

Also shown in FIG. 3 the microphone 16''' is mounted to the exterior surface of the rear lift gate 36 of the vehicle 12. In this embodiment the microphone 38 is mounted to a rear spoiler 39 that overhangs the rear window 38. It is within the scope of this invention to position the microphone 16''' on other external surfaces of the vehicle 12 at other locations that overhang or extend past the lift gate 36, which assists the microphone with pickup since soundwave will reflect off the lift gate 36. Additional possible locations include, but are not limited to spoilers, center high mounted stop lamp housings, backup camera housings, door handles, side view mirrors and one exterior door panels.

Figure 4:
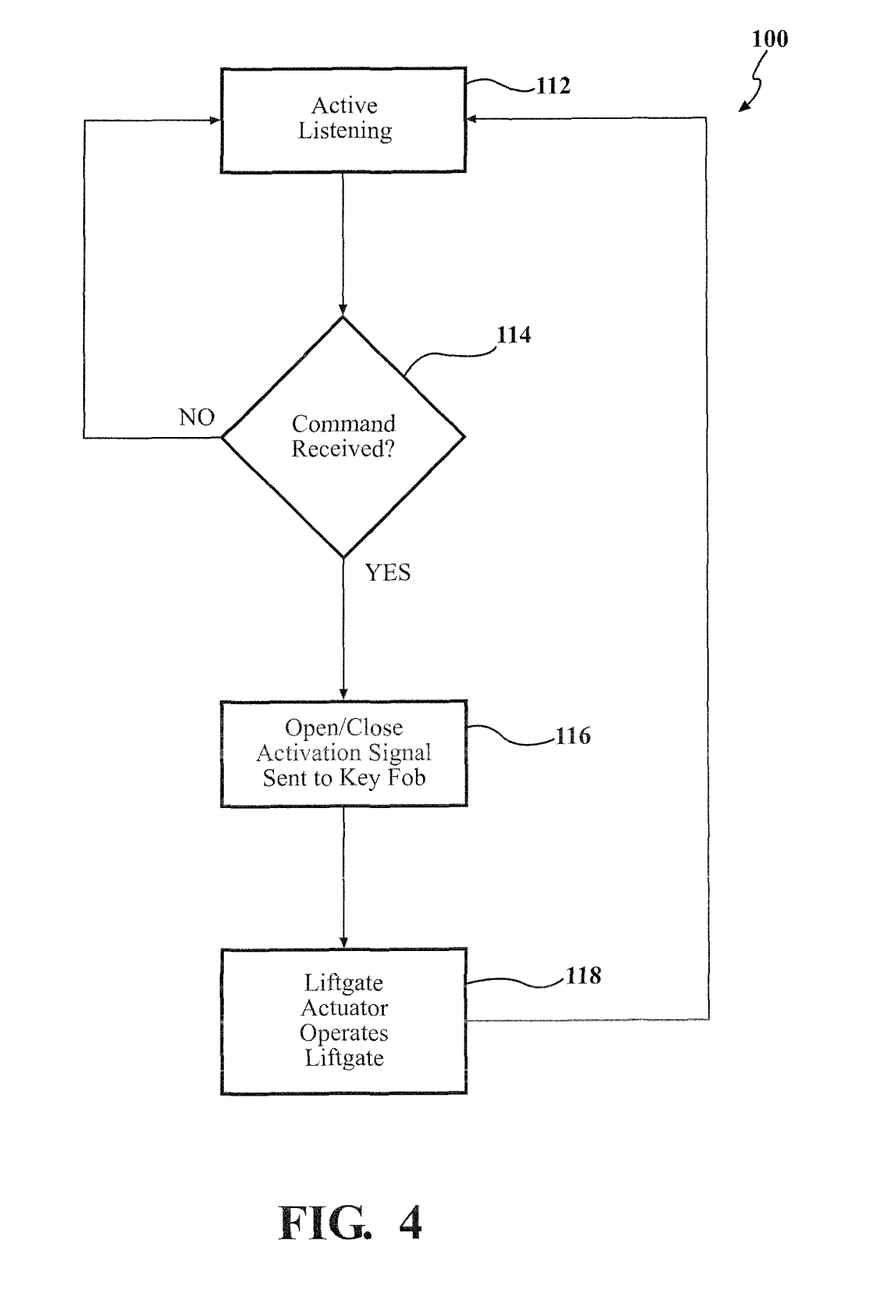
FIG. 4 is a flowchart diagram showing one method of operating a voice activated lift gate according to a first embodiment of the present invention.

Referring now to both FIGS. 1 and 4 a vehicle voice control system 100 is shown in accordance with a first embodiment of the present invention. During a first step 112 the voice actuation unit 13 begins to actively listen for a voiced command from the listening signal 18, 18', 18", 18''', 36 generated from each microphone 16, 16', 16", 16''', 34. At step 114 a determination is made as to whether or not a command has been received or heard by the voice activation unit 13. If it is determined that no voice command has been received, the system returns back to the first step 112 and continues to actively listen for a command signal from a user of the system. If at the step 114 it is determined by the voice actuation unit 13 that a voice command has been received, at a third step 116 an activation signal 23' is sent to the key fob 28. During the third step 116 the key fob 28, which includes the key fob transponder receives the activation signal 23' and outputs an authorization code 40 and key fob activation signal 41 to the receiver processor 31, which then sends the actuator activation signal 33 to the actuator 29. At step 118 the actuator 29 activates, which can be which can be an open or close command signal for embodiments where lift gate actuators, window actuators, door locks, fuel door, trunk and hood actuators for example. After step 118 the vehicle voice control system 100 returns back to step 112.

During the step 116 the receiver processor 42 of the mechanical system under control of the vehicle voice control system 100 receives the identification code and verifies the identification code is an authorizing code. When the identification code is determined to be an authorizing code then at step 118 the receiver-processor authorizes the mechanical system 30 to be activated by the command signal. One particular embodiment of the invention is used to activate the lift gate actuator to open or close the lift gate. However, while the present embodiment of the invention concerns the opening and closing of a lift gate, it is within the scope of this invention for the open and close command to cause other mechanical systems to become active. For example the open or close command could be a command signal that operates window actuators, sunroof actuators or locks and unlocks automatic door locks on the vehicle. The vehicle voice command system 100 of the present invention is an add on control system that utilizes the already existing receiver processor and key fob 28 command signals to activate the mechanical system 30, instead of having the voice activation unit 13 handle the verification of the authorizing code and sending command signals to the actuator of the mechanical system 30 directly.

Figure 5:
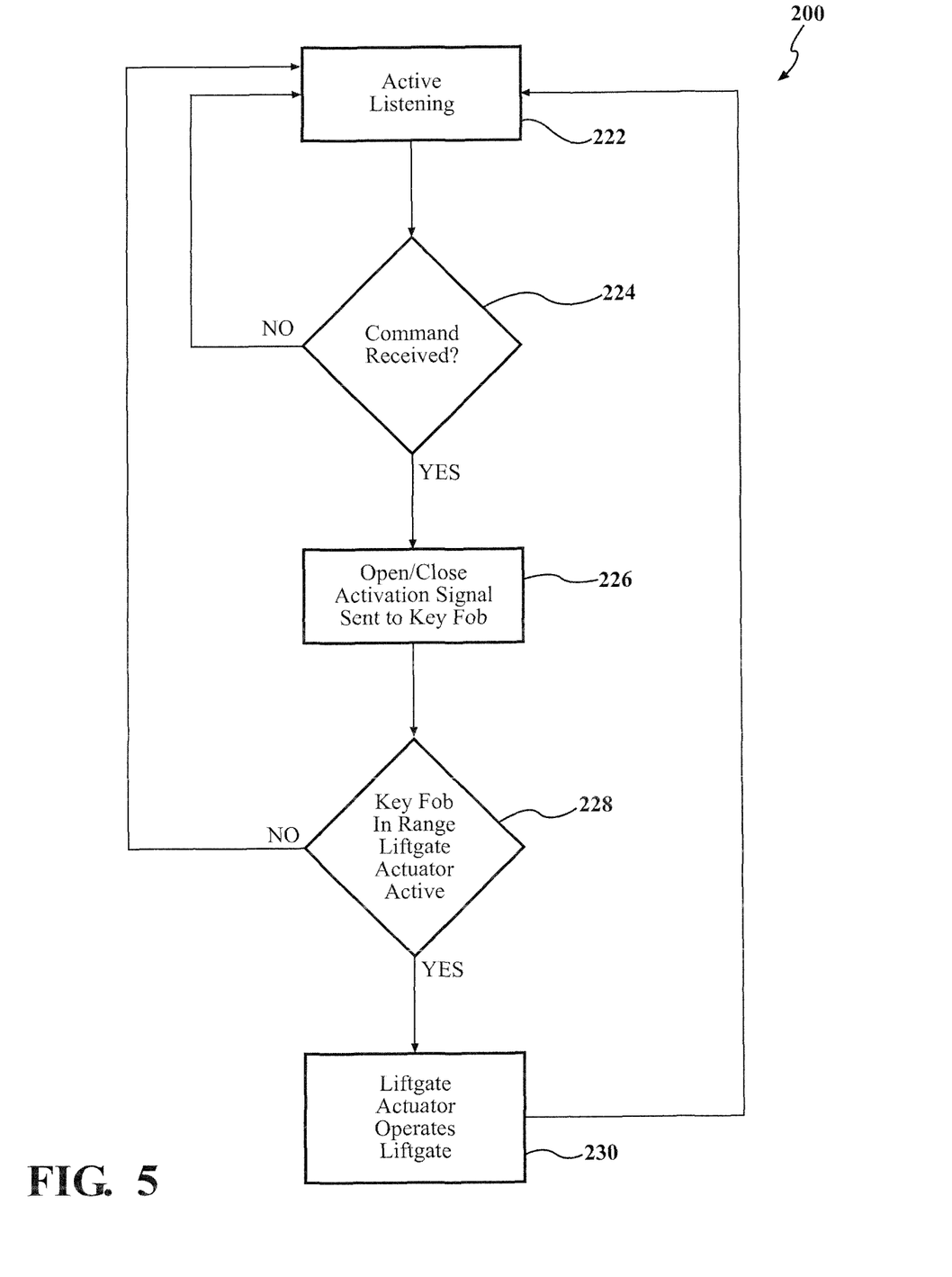
FIG. 5 is a flowchart diagram showing one method of operating a voice activated lift gate according to a second embodiment of the present invention.

Referring now to both FIGS. 1 and 5 a vehicle voice control system 200 is shown in accordance with the second embodiment of the present invention. During a first step 222 the voice actuation unit 13 begins to actively listen for a voiced command. Then at step 224 a determination is made as to whether or not a command has been received or heard by the voice activation unit 13. If it is determined that no command has been received then the system returns back to the first step 222 and continues to actively listen. If at step 224 it is determined by the voice actuation unit 13 that a voice command has been received then at a third step 226, a key fob activation signal 41 is sent to the mechanical system 30 from the voice actuation unit 13. At a step 228 the key fob transponder 28 also outputs the authorization code 40 to the receiver-processor 31 which then verifies the identification code is an authorizing code. If there is no verification or if no verification code is received then the voice control system 200 goes back to the first step 222 and again begins actively listening. If the authorization code 40 is verified and determined to be an authorizing code, then at step 230 the receiver-processor 31 then authorizes the mechanical system 30 to be activated sends the actuator activation signal 33 to the actuator 29 and the actuator 29 is activated. The vehicle voice control system 200 then returns back to step 222. One particular embodiment of the invention is used to activate the lift gate actuator to open or close the lift gate. However, while the present embodiment of the invention concerns the opening and closing of a lift gate, it is within the scope of this invention for the open and close command to cause other mechanical systems to become active. For example the open or close command could be a command signal that operates window actuators, sunroof actuators or locks and unlocks automatic door locks on the vehicle.

The description of the invention is merely exemplary in nature and, thus, variations that do not depart from the gist of the invention are intended to be within the scope of the invention. Such variations are not to be regarded as a departure from the spirit and scope of the invention.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A vehicle voice control system comprising:
   a voice actuation unit including at least one microphone that generates a listening signal, the voice actuation unit also having a computer device connected to the vehicle, the computer device has voice activation software programmed on to the computer device, wherein the voice activation software performs an analysis of the listening signal to filter out ambient noise that can be interpreted as a false command signal and determine when the voice activation unit receives a voiced command said voice actuation unit generates an activation signal to activate a mechanical system;
   a key fob transponder that outputs an identification code;
   a receiver-processor that receives the activation signal and the identification code, wherein the receiver processor verifies said identification code is an authorizing code and when said identification code is an authorizing code, said receiver-processor sends an actuator activation signal to said mechanical system.

2. The voice control system for a vehicle of claim 1 wherein the mechanical system also includes control hardware operationally connected to the vehicle for controlling at least one action in the vehicle.

3. The voice control system for a vehicle of claim 2 wherein the at least one action is one selected from the group including door unlocking, door opening, window opening, vehicle ignition, vehicle lights, opening rear lift gate or trunk, fuel door release and emergency alerts.

4. The voice control system of claim 1 wherein the at least one microphone is mounted on an exterior surface of the vehicle.

5. The voice control system of claim 4 wherein the at least one microphone is mounted to one of a spoiler, a center high mounted stop lamp housing, a back-up camera housing, door panel, lift gate panel, roof, roof rail, roof pillar and a side view mirror housing.

6. A vehicle voice control system comprising:
a voice actuation unit including at least one microphone that generates a listening signal, the voice actuation unit also having a computer device connected to the vehicle, the computer device has voice activation software programmed on to the computer device, wherein the voice activation software performs an analysis of the listening signal to filter out ambient noise that can be interpreted as a false command signal and determine when the voice actuation unit receives a voiced command and on receipt of said voiced command said voice actuation unit generates an activation signal;
a key fob transponder that receives the activation signal and outputs an identification code and a key fob activation signal; and
a receiver-processor that receives the identification code and verifies said identification code is an authorizing code and when said identification code is an authorizing code, said receiver-processor sends an actuator activation signal to said mechanical system.

7. The voice control system for a vehicle of claim 6 wherein said mechanical system also includes control hardware operationally connected to the vehicle for controlling at least one action in the vehicle.

8. The voice control system for a vehicle of claim 7 wherein the at least one action is one selected from the group including door unlocking, door opening, window opening, vehicle ignition, vehicle lights, opening rear lift gate or trunk, fuel door release and emergency alerts.

9. The voice control system of claim 6 wherein the at least one microphone is mounted on an exterior surface of the vehicle.

10. The voice control system of claim 9 wherein the at least one microphone is mounted to one of a spoiler, a center high mounted stop lamp housing, a back-up camera housing, door panel, lift gate panel, roof, roof rail, roof pillar and a side view mirror housing.

11. A voice control system for a vehicle comprising:
a vehicle which includes a lift gate having an outside surface exposed to the exterior of the vehicle and an inside surface exposed to an interior of a passenger compartment of the vehicle;
a plurality of microphones located on the exterior of the vehicle at locations, wherein each one of the plurality of microphones generate a listening signal indicative of exterior noises detected by the respective one of the plurality of microphones; and
a voice actuation unit for receiving each listening signal from each of the plurality of microphones, wherein the voice actuation unit has a computer device connected to the vehicle, the computer device has voice activation software that performs an analysis of the listening signal to filter out ambient noise that can be interpreted as a false command signal and determining the presence of a pre-identified command of the user and generating a command signal if the pre-identified command is detected; and
a mechanical system for receiving the command signal and operating the mechanical system.

12. The voice control system for a vehicle of claim 9 wherein said mechanical system includes control hardware operationally connected to the vehicle for controlling at least one action in the vehicle.

13. The voice control system for a vehicle of claim 12 wherein the at least one action is one selected from the group including door unlocking, door opening, window opening, vehicle ignition, vehicle lights, opening rear lift gate or trunk, and emergency.

14. The voice control system of claim 13 wherein each one of the plurality of microphones is mounted to one of a spoiler, a center high mounted stop lamp housing, a back-up camera housing, door panel, lift gate panel, roof, roof rail, roof pillar and a side view mirror housing.

* * * * *

UNITED STATES PATENT AND TRADEMARK OFFICE
CERTIFICATE OF CORRECTION

| | |
|---|---|
| PATENT NO. | : 11,475,889 B2 |
| APPLICATION NO. | : 16/613658 |
| DATED | : October 18, 2022 |
| INVENTOR(S) | : Steven S. Grgac |

It is certified that error appears in the above-identified patent and that said Letters Patent is hereby corrected as shown below:

In the Claims

Column 8,
Line 33, Claim 12 "vehicle of claim 9" should be -- vehicle of claim 11 --

Signed and Sealed this
Twenty-fourth Day of January, 2023

Katherine Kelly Vidal
*Director of the United States Patent and Trademark Office*